Sept. 7, 1937.  F. K. ZERBE  2,092,490
ALLOY LINED VESSEL
Filed Dec. 7, 1935

INVENTOR.
FREDERICK K. ZERBE
BY
ATTORNEY.

Patented Sept. 7, 1937

2,092,490

UNITED STATES PATENT OFFICE 2,092,490

ALLOY LINED VESSEL

Frederick K. Zerbe, Waukesha, Wis., assignor to A. O. Smith Corporation, Milwaukee, Wis., a corporation of New York Application December 7, 1935, Serial No. 53,296

2 Claims. (Cl. 220—63)

This invention relates to metallic vessels lined with corrosion-resistant alloy sheets and is specifically adaptable to alloy lined vessels containing a head intermediate their ends and dividing such vessel into compartments.

Figure 1:
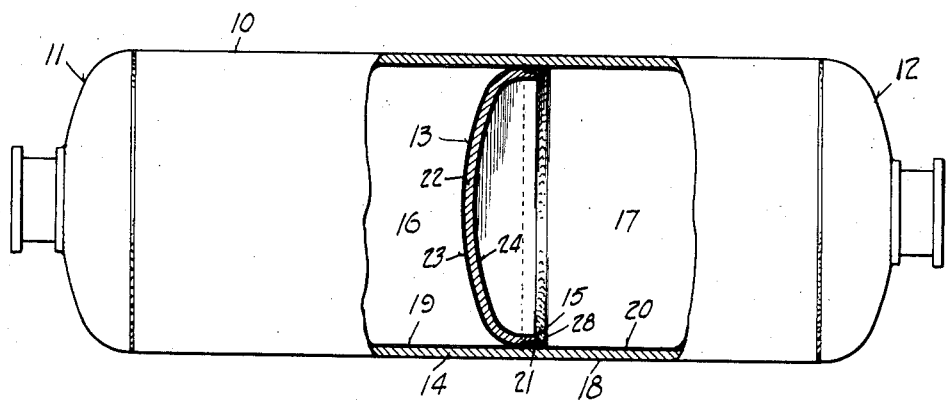
Figure 2:
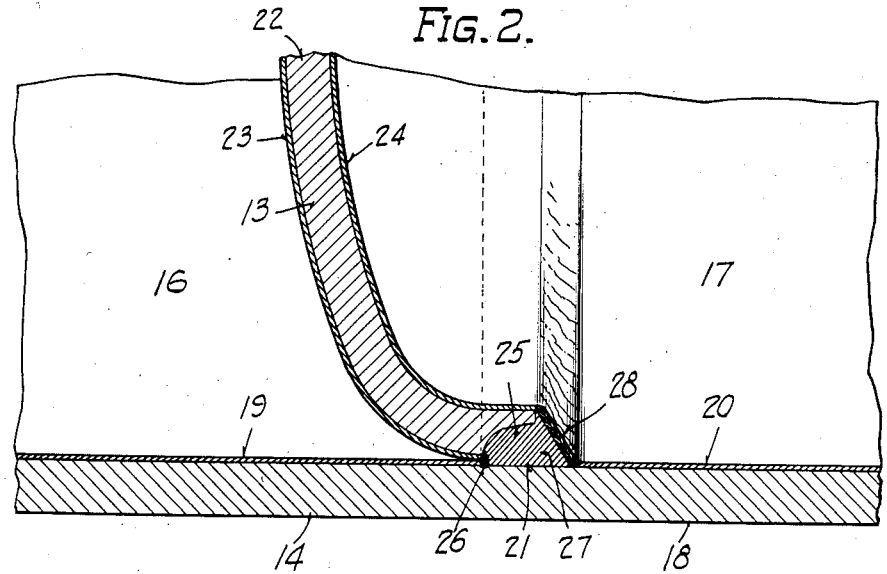

The invention will be better understood by referring to the accompanying drawing of which:

Figure 1 is a side view of a vessel embodying the present invention and sectioned in its midportion to disclose an intermediate head; and Fig. 2 is an enlarged drawing of the lower part of the sectioned portion of Fig. 1.

Referring to the figures, 10 represents a metallic vessel having heads at 11 and 12. An intermediate head 13 is shown preferably as a dished head united to the wall 14 of the vessel 10 in a circumferential line of joinder at position 15. Head 13 divides vessel 10 into compartments 16 and 17, either compartment of which is capable of holding fluid under pressure independent of the other compartment. Compartments 16 and 17 are also shown as lined with corrosion-resistant liners to protect the vessel walls against corrosion. The vessel wall plates 18 themselves are preferably of mild carbon steel suitable for sustaining the pressures involved and the liner may be a chromium steel or other alloy of a composition designed to limit its corrosion under action of the contained fluid to a desired minimum.

Alloy sheets 19 and 20 are secured to the vessel walls 18 of the respective compartments 16 and 17 preferably by spot welding and also preferably before said plate 18 has been formed into the vessel wall and while still in the flat plate. The liner plates are omitted in the area 21.

Intermediate head 13 has its plate 22 protected by alloy liner sheets 23 and 24 preferably by spot welding said sheets to said plate before forming the same into the dished shape shown. Head 13 after forming is then assembled in the position shown to divide the vessel into compartments 16 and 17. Upon the employment of a dished head, or one shaped other than flat, liner plate 23 is placed in approximate contact with the vessel wall liner plate 19, the end of head plate 22 having been cut away at position 25 to form a welding groove. The edges of alloy sheets 19 and 23 are welded together by the fusion deposit of alloy material therealong at 26 in the bottom of the groove. This alloy material is preferably of approximately the same composition as that of the alloy sheets being joined thereby.

After the depositing of alloy welding material 26 head plate 22 and vessel wall plate 18 are joined by the fusion deposition of weld metal 27 which is of approximately the composition and physical characteristic of the plates being joined, normally mild steel.

Alloy weld metal 28 preferably of approximately the composition of the alloy sheets is then deposited over the milder steel weld metal 27 to protect the same against corrosion. Metal 28 connects liner sheets 24 and 20 with an impervious seal against the corrosive elements to be contained in chamber 17.

The omission of the alloy sheets in the region 21 permits the production of a superior structure of uniform characteristics extending between the main plates of head 13 and the vessel wall 14. In the structure illustrated, involving a dished intermediate head, the alloy weld as at 26 in the bottom of the welding groove joins the protective sheets at their edges and effectively seals the line between said sheets against the passage of corrosive elements to the main strength-sustaining structure of the vessel joinder. The application of the mild steel or similar weld metal thereto to complete the joint securely embeds and secures said alloy in position. Any admixture of mild steel and alloy is farthest removed from the corrosive surface which is of maximum purity having been formed by the depositing of alloy on alloy. The final alloy covering 28, while deposited upon mild steel and thus more subject to dilution by mild steel, is positioned in an accessible place for repairs in case such repairs ever become necessary. It is preferable to employ two or more layers of alloy deposit at 28 to minimize the amount of alloy dilution taking place in such weld exterior.

It is also preferable to deposit the metal of the welds herein described by means of the metallic arc maintained in a protecting atmosphere.

Other modifications of the invention herein disclosed may be made by those skilled in the art without departing from the spirit of said invention.

I claim:

1. In a pressure vessel, a mild steel shell, a pair of circumferentially extending sheets of protective alloy welded thereto and spaced edgewise to provide a circumferential zone of unprotected shell, a mild steel dished head both sides of which are covered with protective alloy sheets secured thereto by welding, the edge of said head being circumferentially chamfered and unprotected by said sheets and cooperating with said unprotected shell zone to provide a welding groove the bottom of which is formed by the parallel aligned edges of one of the shell protecting sheets and the outer protecting sheet of the head, protective alloy weld metal joining said aligned edges of protective sheets within said welding groove, mild steel weld metal filling said groove and joining said head and shell plates, and protective alloy metal joining the remaining protective sheets of said shell and head and covering said mild steel weld metal.

2. In a protective alloy sheet lined cylindrical pressure vessel having two compartments separated by a dished head protected on each side by alloy sheets, a circumferential unprotected zone of the shell of said vessel and of said head defining a welding groove in the bottom of which protective alloy weld metal joins the edges of the protective alloy sheets of the shell and head of the compartment to which the convex side of the head is presented, weld metal similar to the metal of the shell and head fused with said protective alloy weld metal, said shell and said head to fill said groove, and protective alloy weld metal covering the weld metal of said groove and joining said protective alloy shell and head sheets in said second compartment.

FREDERICK K. ZERBE.